United States Patent [19]

Kawada

[11] 3,840,820

[45] Oct. 8, 1974

[54] MUTING CIRCUIT

[75] Inventor: Hirohito Kawada, Tokyo, Japan

[73] Assignee: Sony Corporation, Tokyo, Japan

[22] Filed: Dec. 4, 1972

[21] Appl. No.: 311,922

[30] Foreign Application Priority Data

Dec. 17, 1971 Japan .............................. 46-119153

[52] U.S. Cl. ............. 330/207 P, 325/362, 325/478, 330/51

[51] Int. Cl. ........................ H03b 21/00, H04b 1/10

[58] Field of Search ...... 325/362, 478, 480; 330/51, 330/207 P

[56] References Cited

UNITED STATES PATENTS 2,926,241 2/1960 Goldman .......................... 330/51 X 3,654,555 4/1972 Ryan .................................. 325/478

*Primary Examiner*—John Kominski

*Assistant Examiner*—Lawrence J. Dahl

*Attorney, Agent, or Firm*—Lewis H. Eslinger, Esq.; Alvin Sinderbrand, Esq.

[57] ABSTRACT

A muting circuit, suitable for use with an amplifier of the type having a constant current source consisting of a transistor, includes a muting transistor connected between the output of the amplifier and the ground for shunting the signal, and a detecting circuit which detects a voltage potential at the base of the transistor forming the constant current source and controls the muting transistor in response to changes in the detected voltage potential.

7 Claims, 1 Drawing Figure

PATENTED OCT 8 1974
3,840,820
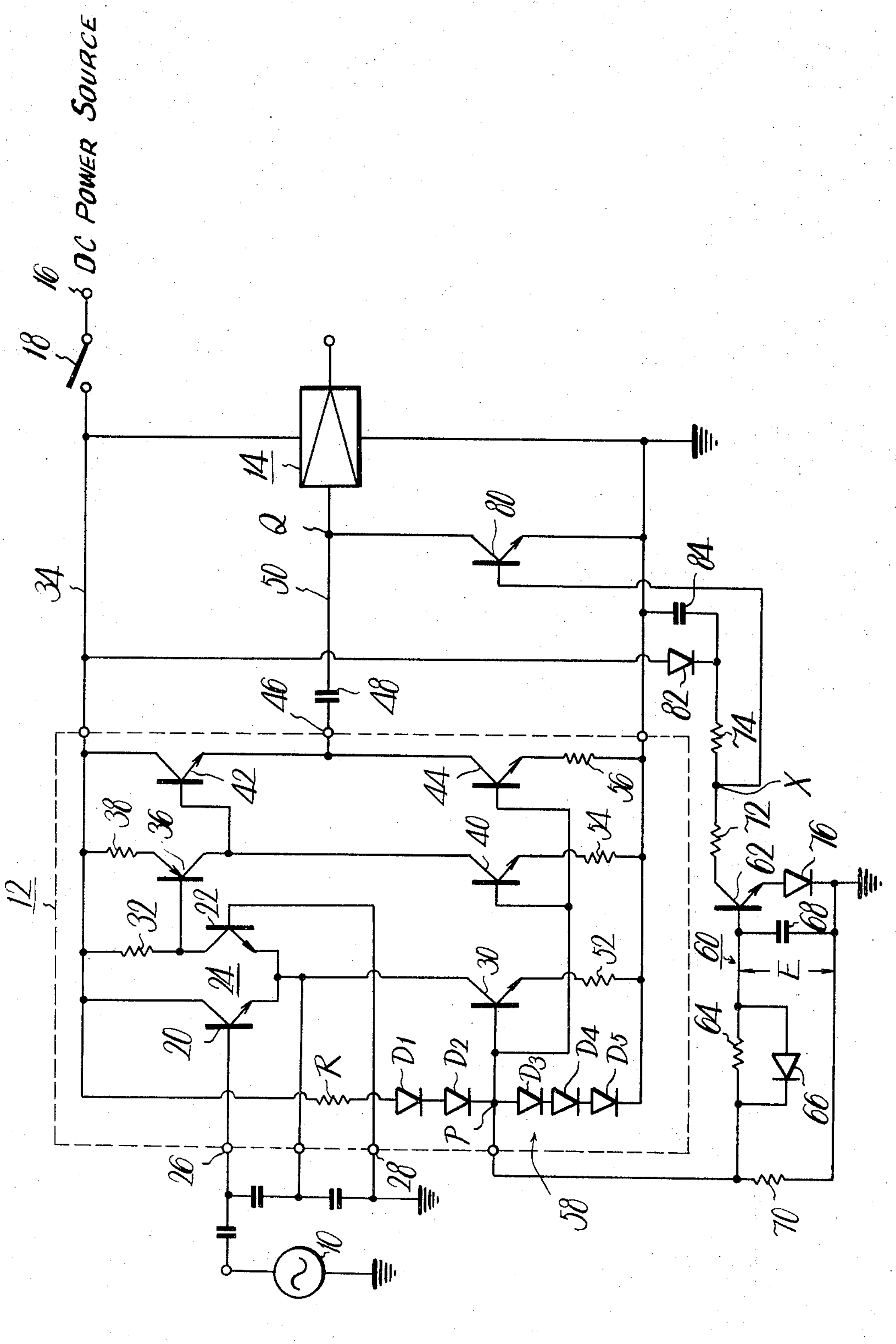

MUTING CIRCUIT

BACKGROUND OF THE INVENTION

The invention relates in general to muting circuits and more particularly to a muting circuit suitable for use with an integrated circuit.

In an audio-frequency amplifier, an abnormally loud sound is sometimes generated from a loudspeaker when its power switch is turned on. It is considered that this phenomenon results from an unusual operation caused until the voltage applied to the amplifier from the power source reaches the normal level. If such a phenomenon occurs at the pre-amplifier, the aforesaid abnormally loud sound will be greatly amplified by the main amplifier. As a result, an extraordinary loud sound is generated from the loudspeaker and under certain circumstances the loudspeaker is thereby damaged. The above phenomenon is also caused when the power switch is turned off.

In order to prevent the occurrance of such a loud sound, there has been hitherto proposed a device in which a switch mechanically linked with the power switch is provided to thereby short-circuit the signal transmitting line when the power switch is turned on and off. In such a circuit, however, when an attachment plug is engaged with or disengaged from a receptacle with the power switch being kept "on," an abnormally loud sound is often still generated with the result that the special switch is useless. Furthermore a number of recent amplifier circuits are formed as integrated circuits. However, there has not been provided an adequate muting circuit specially developed for such amplifiers formed as integrated circuits.

SUMMARY OF THE INVENTION

The above and other disadvantages are overcome by the muting circuit of this invention which is suitable for use with a differential amplifier connected in a signal transmission line and having a constant current source, the muting circuit comprising a detecting circuit for detecting the rising and falling of a voltage at the constant current source in accordance with supply and interruption of an operative current to the amplifier, and a muting transistor connected between the signal transmission line and the ground, the aforesaid muting transistor being controlled in response to an output of the aforesaid detecting circuit for a longer time than that required by the rising or falling of the voltage of the amplifier.

Accordingly, one object of this invention is to provide an electronic muting circuit free from the above described drawbacks of the prior art.

Another object of this invention is to provide a muting circuit to control a muting transistor by detecting a potential at a constant current source connected to a differential amplifier.

A further object of this invention is to provide a muting circuit suitable for use with an integrated circuit.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWING

The FIGURE is a circuit diagram showing a muting circuit according to the invention.

DESCRIPTION OF THE PREFERRED EMBODIMENT

An embodiment of the invention is illustrated as a muting circuit for use in the audio-frequency amplifying stage of audio-frequency equipment, such as, for example, a radio receiver.

In the figure, reference numeral 10 designates a signal source from which an audio-frequency signal is supplied to a pre-amplifier 12. The output of the pre-amplifier 12 is supplied by a lead 50 to a main amplifier 14. A DC power terminal 16 supplies a DC voltage from an external source (not shown) through a power switch 18 and a DC bus conductor 34 to the pre-amplifier 12 and the main amplifier 14. The pre-amplifier 12 comprises a differential amplifier 24 consisting of a pair of NPN type transistors 20 and 22, the bases of which are respectively connected to the signal source 10 through input terminals 26 and 28. The emitters of the transistors 20 and 22 are interconnected and are further connected to the collector of an NPN transistor 30 which forms a constant current source.

The collector of the transistor 20 is connected directly to the DC bus conductor 34. The collector of the transistor 22 is connected to the DC bus conductor 34 through a resistor 32 and also to the base of a PNP type amplifying transistor 36. The transistor 36 is connected at its emitter to the bus conductor 34 through a resistor 38 and at its collector to the collector of an NPN transistor 40 which serves as the collector load of the transistor 36.

The transistor 36 is further connected at its collector to the base of an NPN transistor 42 which forms an emitter follower stage. The transistor 42 is connected at its collector to the bus conductor 34 and at its emitter directly to the collector of an NPN transistor 44, forming the emitter load thereof, and through an output terminal 46 of the pre-amplifier 12 and a coupling capacitor 48 to the main amplifier 14 by passing through a signal transmitting conductor 50. Further, the emitters of the transistors 30, 40 and 44, which form the constant current sources, are separately grounded through resistors 52, 54 and 56, respectively.

The pre-amplifier 12 also includes a series circuit 58 connected to the bases of the transistors 30, 40 and 44. The series circuit 58 includes a resistor R connected at one end to the DC bus conductor 34 and connected at its other end to diodes $D_1$ and $D_2$ which are connected in series between the resistor R and the bases of the transistors 30, 40 and 44 (designated point P). A series connection of diodes $D_3$, $D_4$ and $D_5$ are connected between the point P and the circuit ground. It will be noted that the pre-amplifier 12 is formed as an integrated circuit in which the transistors, resistors and diodes are formed on a single semiconductive substrate (as indicated by the dashed line).

In the present invention, there is provided a detecting circuit 60 for detecting the rising and falling (or surges) of a voltage within the amplifier, for example, the pre-amplifier 12 in accordance with the opening and closing of the switch 18. The detecting circuit 60 includes an NPN transistor 62 and a resistor 64 connected between the base of the transistor 62 and the connection point P of the circuit 58. A diode 66 has its anode connected to the base of the transistor 62 and its cathode connected to the point P. A capacitor 68 is connected between the base of the transistor 62 and the circuit ground and a resistor 70 is connected in parallel with the series circuit of the plurality of diodes $D_3$, $D_4$ and $D_5$. Two resistors 72 and 74 are connected in series between the collector of the transistor 62 and the cathode of a diode 82. The anode of the diode 82 is connected to the DC bus conductor 34. The cathode of diode 82 is also connected to the circuit ground through a capacitor 84 having a large capacity. Reference numeral 76 indicates a diode connected at its anode to the emitter of the transistor 62 and at its cathode to the circuit ground.

Since the detecting circuit 60 is connected between the common connection point P of the bases of the transistors 30, 40 and 44, forming the constant current sources, and the circuit ground as described above, the detecting of the voltage rising and falling (i.e., power surges) in the pre-amplifier 12 in accordance with the opening and closing of the switch 18 is achieved by sensing the potential at point P.

An NPN type muting transistor 80 is connected at its collector to the signal transmitting line, for example, at a point Q in the conductor 50 connecting the amplifiers 12 and 14, and at its emitter to the circuit ground. The base is connected to a connection point X between the resistors 72 and 74 of the circuit 60.

With the above-described arrangement, when the switch 18 is turned on, the pre-amplifier 12 and the main amplifier 14 are supplied with a direct current through the conductor 34, so that both amplifiers 12 and 14 rise to their operative condition. At the instant the switch 18 is closed, however, though a current flows through the diodes $D_3$, $D_4$ and $D_5$ a voltage sufficient to drive the transistors 30, 40 and 44 is not yet produced at the point P and hence the amplifier 12 has not yet reached its operative condition. The circuit 60 is also supplied with a direct current through the resistor R and the diodes $D_1$ and $D_2$ and accordingly the capacitor 68 is electrically charged through the resistor 64. In this case, a voltage E across the capacitor 68 increases according to a time constant determined by the resistor 64 and the capacitor 68.

At the time when the switch 18 is first turned on, the voltage E has not reached a value sufficient to cause the transistor 62 to become conductive, so that the transistor 62 is still nonconductive. Therefore, the point X of the circuit 60 is substantially at the potential of the power source and hence the muting transistor 80 becomes conductive because its base is connected to point X. As a result, the potential of the point Q in the signal transmission line 50 becomes substantially equal to the ground potential and signals transmitted through the conductor 50 are shunted to the circuit ground, thus effecting the so-called muting operation and thereby eliminating the effects of the power surge. Meanwhile, the capacitor 84 is charged through the diode 82 during the time when the switch 18 is closed.

When a predetermined time has passed with the switch 18 being thus closed, the voltage E across the capacitor 68 increases to cause the transistor 62 to become conductive. Accordingly, the potential at the point X is caused to be substantially at the ground potential, so that the transistor 80 is made nonconductive, with the result that the muting operation is released. In the meantime, since the potential at the point P increases with the lapse of time, the transistors 30, 40 and 44 are caused to be in their operative conditions and hence the amplifier 12 becomes operative. For this reason, a signal from the signal source 10 is amplified by the differential amplifier 24 and the transistor 36 and further by the main amplifier 14 for supplying, for example, a loudspeaker.

When the switch 18 is turned off, the electric charge stored in the capacitor 68 is rapidly discharged through the diode 66 and the resistor 70 or the diodes $D_3$, $D_4$ and $D_5$, so that the transistor 62 become nonconductive and the point X is no longer held at the circuit ground potential. Therefore, the electric charge stored in the capacitor 84 flows through the resistor 74 to the base of the transistor 80. As a result of this, the transistor 80 becomes conductive and immediately the signals at point Q are shunted to the circuit ground to perform the muting operation and thereby eliminate the effects of the power surge. When the switch 18 is turned off, a current is forcibly supplied to each base-emitter junction of the transistors 30, 40 and 44 forming the constant current sources by the electric charge stored in the capacitor 68 and hence the amplifier 12 momentarily maintains its operative condition even after the switching-off. However, since the muting transistor 80 is already in its operative condition, there is no possibility that a noise is produced at the time of switching-off.

According to the invention as disclosed above, the operative condition of the amplifier 12 is detected by the circuit 60 to thereby control the muting transistor 80. Accordingly, the muting operation at the time when the power source is switched on and off can be accurately carried out and the conventional drawbacks can be avoided. In the case where the amplifier is formed by an integrated circuit, since a transistor is employed as its constant current source, the base voltage of this transistor is detected to make it possible to judge whether the circuit is under the normal condition or not. Since the muting circuit 60 of the invention only connects to the integrated circuit 12 at two terminals (the point P and the ground) it greatly simplifies manufacture and assembly of the complete audio section.

In the foregoing embodiment the voltage of the constant current source in the pre-amplifier 12 is detected. However, it will be obvious that in other embodiments the voltage of the operative power source may also be detected.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A muting circuit operable during power turn-on and power turn-off to eliminate the effects thereof comprising a transistor amplifier; a constant source transistor disposed as at least one load of said transistor amplifier, means for detecting a base bias voltage of said constant current source transistor, and a first, muting transistor connected across the output of said transistor amplifier, the first, muting transistor being controlled in response to an output of the detecting means.

2. A muting circuit as recited in claim 1 wherein the transistor amplifier includes a differential amplifier having a pair of second and third transistors having their respective emitters interconnected and wherein the constant current source transistor includes a collector connected to the emitters of the second and third transistors.

3. A muting circuit as recited in claim 2 wherein the second and third transistors forming the differential amplifier and the constant current cource transistor are formed on at least a single semiconductive substrate.

4. A muting circuit as recited in claim 3 which further includes a plurality of diodes connected to the base of the constant current source transistor for providing a bias thereto.

5. A muting circuit as recited in claim 2 wherein the detecting means comprises a time constant circuit having a resistor and a first capacitor which are connected in series to the base of the constant current source transistor, and a fourth transistor connected in parallel with the first capacitor, the fourth transistor being controlled in its conductive and nonconductive conditions by an electric charge stored in the first capacitor, the fourth transistor further controlling the first, muting transistor in response to the conductive and nonconductive conditions thereof.

6. A muting circuit as recited in claim 5 wherein the transistor amplifier includes a switch through which power is supplied from an external source, the first, muting transistor being connected at its base to the external power source through the switch and a second capacitor, means for charging the second capacitor during the time when the switch is closed, and means for connecting the second capacitor across the base-emitter junction of the first, muting transistor.

7. A muting circuit as recited in claim 6 further including a diode connected between the switch and the second capacitor so that the electric charge stored in the second capacitor flows to the base of the first, muting transistor when the switch is opened.

* * * * *